US006556231B2

(12) United States Patent
Nishimura

(10) Patent No.: US 6,556,231 B2
(45) Date of Patent: Apr. 29, 2003

(54) THERMOSENSITIVE PRINTER

(75) Inventor: Tomoyoshi Nishimura, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/919,951

(22) Filed: Aug. 2, 2001

(65) Prior Publication Data

US 2002/0021350 A1 Feb. 21, 2002

(30) Foreign Application Priority Data

Aug. 2, 2000 (JP) ....................................... 2000-234078

(51) Int. Cl.[7] ................................................ G01D 15/24
(52) U.S. Cl. ....................................................... 347/218
(58) Field of Search ................................ 347/218, 171, 347/172, 173, 197, 200, 175

(56) References Cited

U.S. PATENT DOCUMENTS 5,216,438 A * 6/1993 Nakao et al. ............... 347/172
5,570,121 A * 10/1996 Mistyurik et al. .......... 347/171
5,745,151 A * 4/1998 Fujishiro .................... 347/175
5,973,711 A * 10/1999 Schartner et al. ........... 347/173
6,011,571 A * 1/2000 Lardant et al. ............. 347/197
6,313,861 B2 * 11/2001 Schartner .................... 347/219
6,339,443 B1 * 1/2002 Nakanishi et al. .......... 347/200

FOREIGN PATENT DOCUMENTS

JP 11078090 A * 12/1997 .............. B41J/2/32

* cited by examiner

*Primary Examiner*—Lamson Nguyen
*Assistant Examiner*—K. Feggins
(74) *Attorney, Agent, or Firm*—Sughrue Mion, PLLC

(57) ABSTRACT

To record an image on a thermosensitive color recording material, a heating element array of a thermal head is pressed onto an obverse side of the thermosensitive color recording material while a platen roller supports the color recording material from its back side. The thermosensitive color recording material is conveyed first in a forward direction for recording a yellow frame, next in a backward direction for recording a magenta frame, and then again in the forward direction for recording a cyan frame. A rotary shaft of the platen roller is mounted to bearing members that are caused by a pair of piezoelectric actuators to slide back and forth along conveying directions of the thermosensitive color recording material, thereby to displace a rotary center of the platen roller upstream from a center of the heating element in either conveying direction of the thermosensitive color recording material.

11 Claims, 6 Drawing Sheets

THERMOSENSITIVE PRINTER

BACKGROUND OF THE INVENTION

1. Field of the Invention

The present invention relates to a thermosensitive printer, and more particularly to a thermosensitive color printer where a full-color image is recorded on a thermosensitive color recording material in a three-color frame sequential fashion while the thermosensitive color recording material is being moved back and forth relative to a thermal head.

2. Background Arts

The thermosensitive color recording material used in the thermosensitive color printer has thermosensitive coloring layers for cyan, magenta and yellow formed atop another on one side of a base material, and a transparent protection layer is formed on an uppermost coloring layer. Hereinafter, the thermosensitive color recording material will be called simply the color recording material. As the color recording material moves relative to the thermal head that is pressed on the top side of the color recording material, the thermal head heats the color recording material such that the coloring layers develop the three colors sequentially from the upper layer to the lower layer. To stop the previously colored layer from coloring again by heat energy applied for the next coloring layer, the upper two coloring layers, e.g. yellow and magenta coloring layers, are designed to be fixed by ultraviolet or near-ultraviolet rays of specific wavelengths respectively before starting recording on the next layer.

The thermal head is provided with a heating element array that consists of a large number of heating elements aligned along a transverse direction to the moving direction of the color recording material. The heating elements are located on a ridge or summit of a semi-cylindrical protrusion that extends in the transverse direction, so that the heating elements are brought into tight contact with the color recording material, and thus the heat energies are efficiently transmitted to the color recording material. The semi-cylindrical protrusion is provided as a portion of a glaze layer that is formed on an aluminum substrate.

Meanwhile, as disclosed for example in Japanese Laid-open Patent Application No. 2000-71495, a teaching to displace the center of a platen roller from a center of the heating element by an appropriate offset amount in an appropriate offset direction has been know in the art. This is for the purpose of optimizing the contacting condition of the color recording material with the heating element array, and thus obtaining adequate graininess of the recorded image. As described in this prior art, graininess of the recorded image becomes adequate when the color recording paper is cooled moderately after being heated by the heating elements.

Because the thermosensitive color printer disclosed in this prior art is of a type that records the image only while the color recording paper is being conveyed in a predetermined direction, the position of the platen roller relative to the heating element array is fixed at an optimum offset position for any colors. However, there is a type of thermosensitive color printer where the thermal head records one color frame as the color recording material moves in one direction, and a next color frame as the color recording material moves reversely. In this type of printer, adequate graininess cannot be obtained by displacing the center of the platen roller constant amount and direction from the center of the heating element array.

SUMMARY OF THE INVENTION

In view of the foregoing, an object of the present invention is to provide a thermosensitive printer that provide optimum contacting conditions of the thermosensitive recording material with the heating element array during recording.

Another object of the present invention is to provide a thermosensitive color printer that provide optimum contacting conditions of the thermosensitive color recording material with the heating element array during recording any color frames, even where the recording is executed alternately in opposite paper conveying directions.

According to an aspect of the present invention, in a thermosensitive printer that records an image on a thermosensitive recording material by heating the thermosensitive recording material through an array of plurality of heating elements of a thermal head as the thermosensitive recording material is conveyed perpendicularly to the array of the heating elements, the thermosensitive printer comprises a platen roller placed in opposition to the array of the heating elements, for supporting the thermosensitive recording material from its back side while the heating elements are pressed onto an obverse side of the thermosensitive recording material; and an offset adjusting device for adjusting offset amount and offset direction of a rotary center of the platen roller from a center of the heating element in a conveying direction of the thermosensitive recording material.

According to a preferred embodiment, the center of the platen roller is displaced by a predetermined amount upstream from the center of the heating element in the conveying direction of thermosensitive recording material.

According to another aspect of the present invention, in a thermosensitive color printer that records a full-color image on a thermosensitive color recording material having thermosensitive coloring layers for yellow, magenta and cyan, by heating the thermosensitive color recording material through an array of plurality of heating elements of a thermal head, wherein the thermosensitive color recording material is conveyed alternately in opposite directions perpendicular to the array of the heating elements, to record the full-color image in a three-color frame sequential fashion, the thermosensitive printer comprises a platen roller placed in opposition to the array of the heating elements, for supporting the thermosensitive color recording material from its back side while the heating elements are pressed onto an obverse side of the thermosensitive color recording material; and an offset adjusting device for adjusting offset amount and offset direction of a rotary center of the platen roller from a center of the heating element along the conveying directions of the thermosensitive color recording material.

The offset adjusting device preferably displaces the center of the platen roller upstream from the center of the heating element in either conveying direction of the thermosensitive recording material.

According to another preferred embodiment, the offset amount of the center of the platen roller from the center of the heating element is predetermined for each color.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
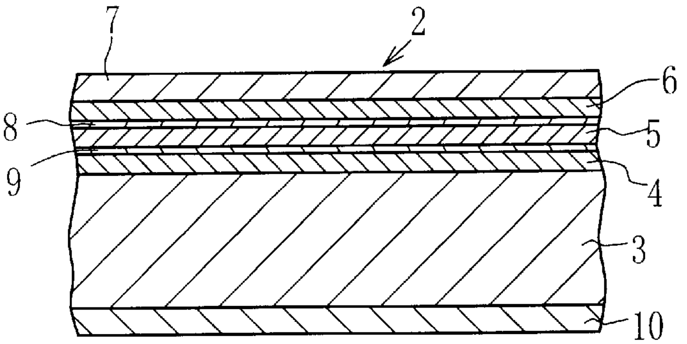
FIG. 1 is an explanatory diagram illustrating a layered structure of a thermosensitive color recording material.

As shown in FIG. 1, a thermosensitive color recording material 2 has a thermosensitive cyan coloring layer 4, a thermosensitive magenta coloring layer 5, a thermosensitive yellow coloring layer 6 and a transparent protection layer 7 formed atop another on one side of a base material 3. The uppermost yellow coloring layer 6 has the highest thermal sensitivity and is fixed or loses its coloring ability when exposed to near-ultraviolet rays of 420 nm. The magenta coloring layer 7 has a lower thermal sensitivity and is fixed when exposed to ultraviolet rays of 365 nm. The lowermost cyan coloring layer 8 has the lowest thermal sensitivity. The protection layer 7 is made of a resin whose main component is PVA (polyvinyl-alcohol), and protects the coloring layers from scratches and stains. Intermediate layers 8 and 9 are provided between the three coloring layers, for adjusting thermal sensitivities of the coloring layers. Designated by 10 is a backing layer.

Figure 2:
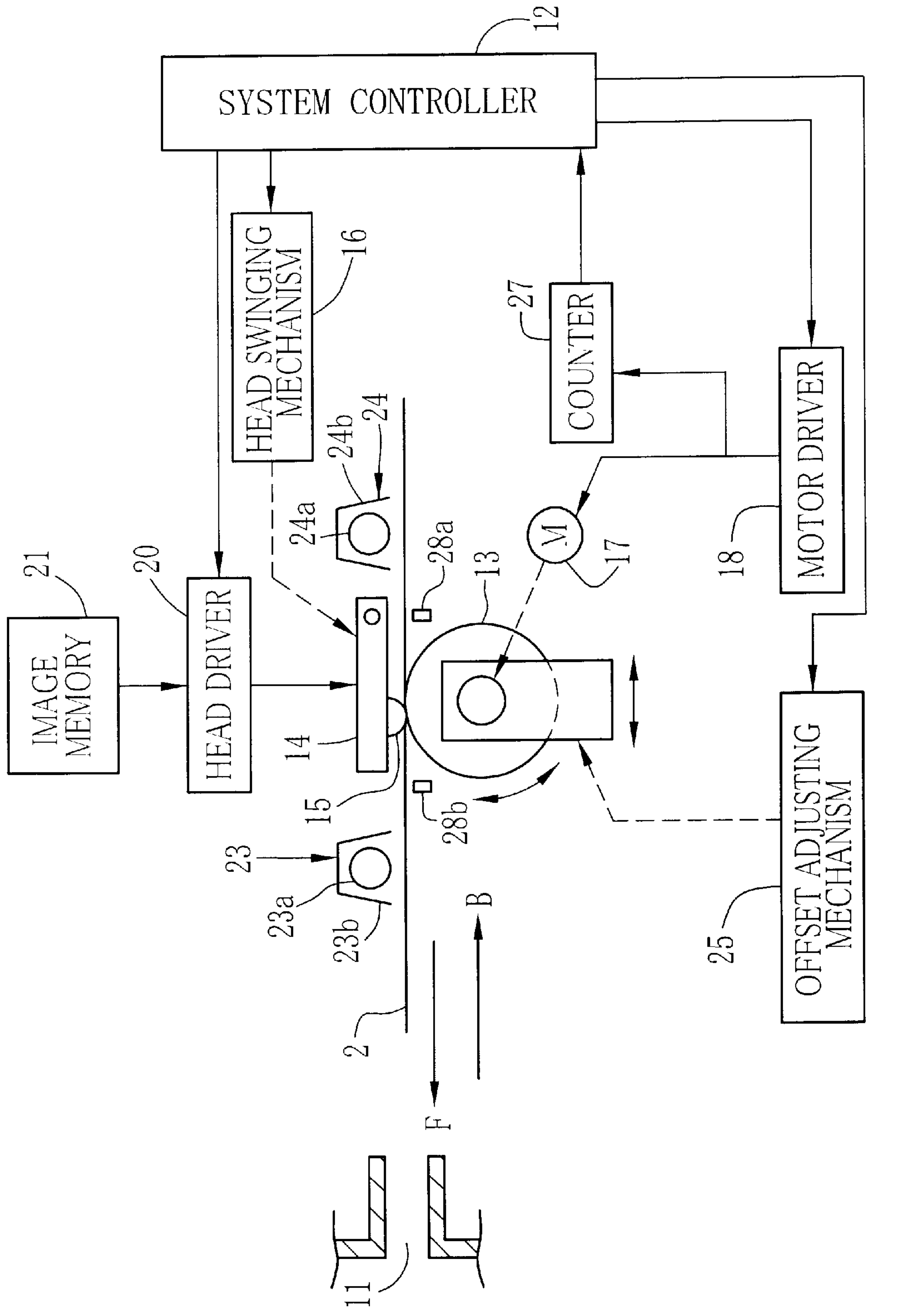
FIG. 2 is a schematic diagram illustrating a thermosensitive color printer according to an embodiment of the present invention.

FIG. 2 shows an embodiment of a thermosensitive color printer of the present invention. The color recording material 2, that is previously cut into an appropriate length, is supplied from a paper supply side, the right side in the drawing, and conveyed along a straight paper transport path. Hereinafter, the direction from the paper supply side toward a paper exit 11 will be referred to as the forward direction F, and the reverse direction will be referred to as the backward direction B.

Respective sections of the thermosensitive color printer are under the control of a system controller 12. A platen roller 13 is located on the bottom side of the paper transport path, and a thermal head 14 is located across the paper transport path from the platen roller 13. The thermal head 14 is provided with a heating element array 15 consisting of a large number of heating elements arranged in a line. The thermal head 14 is movable between a pressing position to press the heating element array 15 onto the color recording material 2 by nipping the color recording material 2 between the heating element array 15 and the platen roller 13, on one hand, and a retract position away from the color recording material 2, on the other hand, through a head swing mechanism 16.

The platen roller 13 is driven to rotate in opposite directions by a pulse motor 17, that is driven to rotate in opposite directions by a motor driver 18 under the control of the system controller 12. As the pulse motor rotates forward, the platen roller 13 rotates counterclockwise in FIG. 2, to convey the color recording material 2 in the forward direction F. As the pulse motor rotates rearward, the platen roller 13 rotates clockwise in FIG. 2, to convey the color recording material 2 in the rearward direction B.

The thermal head 14 is driven by a head driver 20. Image data of three colors of a full-color image to record is previously written on an image memory 21. In synchronism with the conveying movement of the color recording material 2, image data of one color frame to record is read out from the image memory 21, line by line, and is sent to the head driver 20. The head driver 20 drives the heating elements on the basis of the image data of one line, to apply heat energies from the heating elements to the color recording material 2, recording a corresponding line of the color frame on the corresponding coloring layer of the color recording material 2.

An yellow fixing device 23 and a magenta fixing device 24 are placed along the paper transport path behind and before the thermal head 14 in the forward direction F respectively. The yellow fixing device 23 consists of an ultraviolet lamp 23*a* radiating near-ultraviolet rays of peak wavelength of 420 nm, and a reflector 23*b*. The magenta fixing device 24 consists of an ultraviolet lamp 24*a* radiating ultraviolet rays of peak wavelength of 365 nm, and a reflector 24*b*.

While the color recording material 2 is being conveyed in the forward direction F for the first time, the yellow frame is recorded line by line on the color recording material 2 by driving the thermal head 14 on the basis of the yellow image data. The ultraviolet lamp 23*a* of the yellow fixing device 23 is turned on during recording the yellow frame, to project the near-ultraviolet rays onto the color recording material 2 and fix the yellow coloring layer 6 after having the yellow frame recorded thereon.

Thereafter the color recording material 2 is conveyed in the backward direction B, and the magenta frame is recorded line by line on the color recording material 2 by driving the thermal head 14 on the basis of the magenta image data. The ultraviolet lamp 24*a* of the magenta fixing device 24 is turned on during recording the magenta frame, to project the ultraviolet rays onto the color recording material 2 and fix the magenta coloring layer 5 after having the magenta frame recorded thereon. After the magenta recording, the color recording material 2 is conveyed again in the forward direction, to record the cyan frame line by line in the same way as other frames.

A counter 27 counts drive pulses as supplied to the pulse motor 17. A pair of edge sensors 28*a* and 28*b* are disposed before and behind the platen roller 13 in the forward direction F, to detect opposite edges of the color recording material 2 as the color recording material 2 is conveyed along the paper transport path. The system controller 12 determines the position of the color recording material 2 on the paper transport path with reference to the count of the counter 27 and detection signals from the edge sensors 28*a* and 28*b*.

Figure 3:
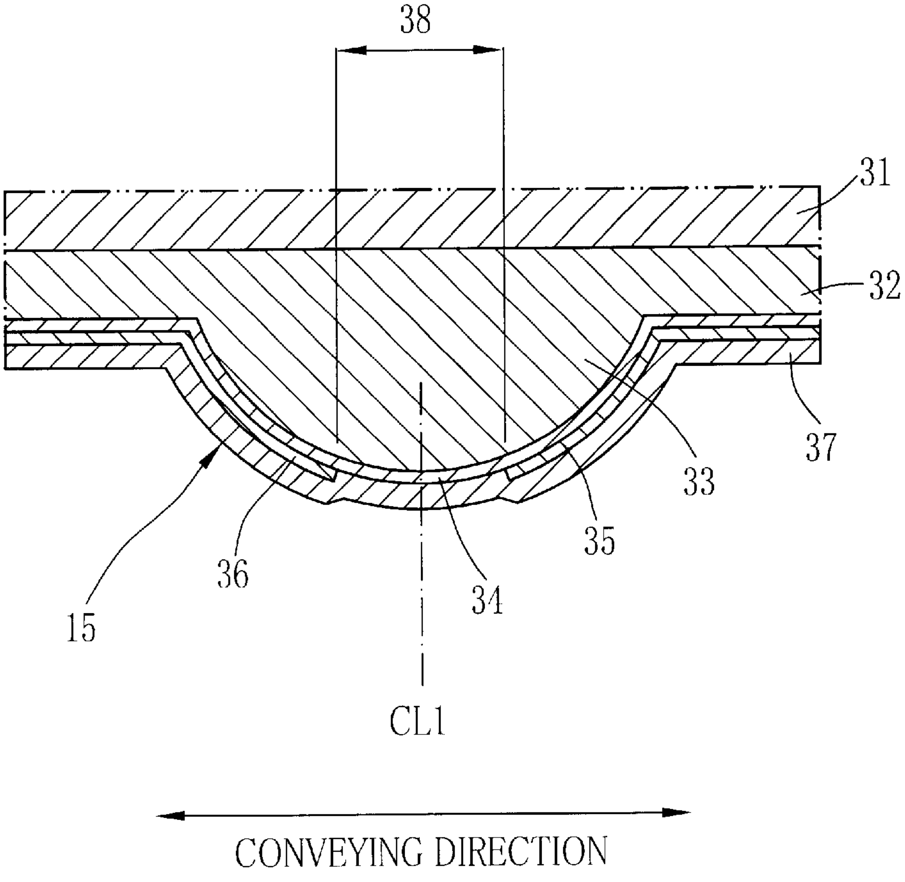
FIG. 3 is a sectional view of the thermal head, illustrating a structure of a heating element array.

An offset adjusting mechanism 25 is provided for sliding the platen roller 13 along the paper transport path, i.e. the paper conveying direction, so as to adjust offset amount and direction of a center of the platen roller 13 relative to a center of the heating element array 15, wherein the center of the platen roller 13 is a rotary center and the center of the heating element array 15 is the summit of a semi-cylindrical glaze protrusion 33, as indicated by CL1 in FIG. 3.

FIG. 3 shows an internal structure of the heating element array 15, wherein a glaze layer 32 having the semi-cylindrical glaze protrusion 33 is formed on an aluminum substrate 31. A heat generating resistance layer 34 is formed on the surface of the glaze layer 32, and a pair of electrodes 35 and 36 are formed on the resistance layer 34 to cover the resistance layer 34 except a center fragment of the glaze protrusion 33. The exposed resistance layer 34 in the center fragment of the glaze protrusion 33 serves as the heating element 38, and is heated by a voltage applied to the electrodes 35 and 36. A protective layer 37 covers up the surface of the heating element array 15.

The heating elements 38 of the heating element array 15 are aligned in a direction perpendicular to the paper conveying direction of the color recording material 2. The heating elements 38 are also centered with the center CL1 of the semi-cylindrical glaze protrusion 33 in the paper conveying direction.

Figure 4:
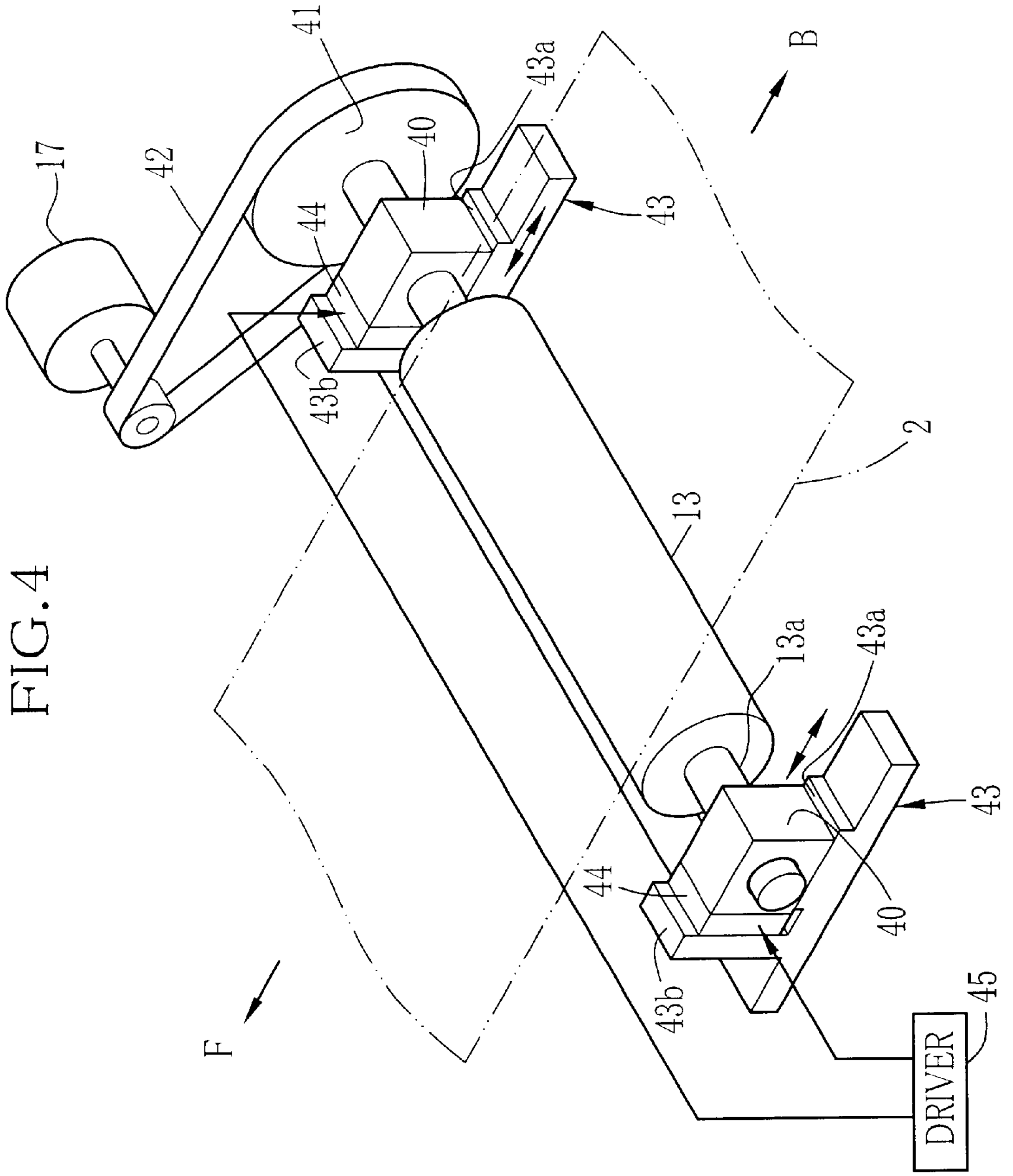
FIG. 4 is a perspective view of an offset adjusting mechanism of the thermosensitive color printer, for adjusting offset amount and direction of a platen roller relative to a heating element array of a thermal head.

FIG. 4 shows an example of the offset adjusting mechanism 25. The platen roller 13 is rotatably held at its opposite ends of a rotary shaft 13*a* by bearing members 40. A pulley 41 is fixedly mounted on one end of the rotary shaft 13*a*, and is coupled to the pulse motor 17 through a timing belt 42, so the rotational movement of the pulse motor 17 is transmitted to the platen roller 13.

The bearing members 40 are each placed on a sliding table 43*a* of a supporting member 43, so that the bearing members 40 may slide on the sliding tables 43*a* in the paper conveying direction. The supporting member 43 is mounted stationary in the thermosensitive color printer. An piezoelectric actuator 44 is cemented to one side of each bearing member 40, and an opposite side of the piezoelectric actuator 44 from the bearing member 40 is cemented to a stopper 43*b* of the supporting member 43.

By applying drive voltage to the piezoelectric actuators 44, the bearing members 40 are displaced in the paper conveying direction. The drive voltage applied to the piezoelectric actuators 44 is controlled by the system controller 12 through a driver 45, to control the amount and direction of displacement of the bearing members 40. With the bearing members 40, the platen roller 13 is displaced in the paper conveying direction.

In this embodiment, the center of the platen roller 13 in the paper conveying direction coincides with the center CL1 of the heating elements 38 while a predetermined reference voltage is applied as the drive voltage to the piezoelectric actuators 44. With an increase of the drive voltage from the reference voltage, the platen roller 13 moves in the backward direction B, so the center of the platen roller 13 is offset from the center CL1 of the heating element 38 to the paper supply side. With an decrease of the drive voltage from the reference voltage, the platen roller 13 moves in the forward direction F, so the center of the platen roller 13 is offset from the center CL1 of the heating element 38 toward the paper exit 11. In either case, the amount of offset increases as the difference (absolute value) of the drive voltage from the reference voltage increases. In this embodiment, the offset amount is adjustable up to about 150 $\mu$m in either direction.

Although the distance between the pulse motor 17 and the pulley 41 changes with the displacement of the platen roller 13, the change is so small that the timing belt 42 can properly transmit the rotational power. But it is of course possible to provide a tension roller for keeping the tension of the timing belt 42 constant regardless of the displacement of the platen roller 13, or make the pulse motor 17 slide with the platen roller 13 for the same purpose. It is also possible to transmit the rotational power of the pulse motor 17 to the platen roller 13 through gears instead of the pulley 41 and the timing belt 42, or couple the shaft 13*a* of the platen roller 13 directly to the rotary shaft of the pulse motor 17.

Although the platen roller 13 is slid in the paper conveying direction by the power of the piezoelectric actuators 44, the thermal head 14 may be displaced instead of the platen roller 13, or both the platen roller 13 and the thermal head 14 may be slid. Instead of the piezoelectric actuators 44, another kind of actuators, like a motor-driven cam mechanism or a solenoid whose plunger stroke is changeable.

Figure 5:
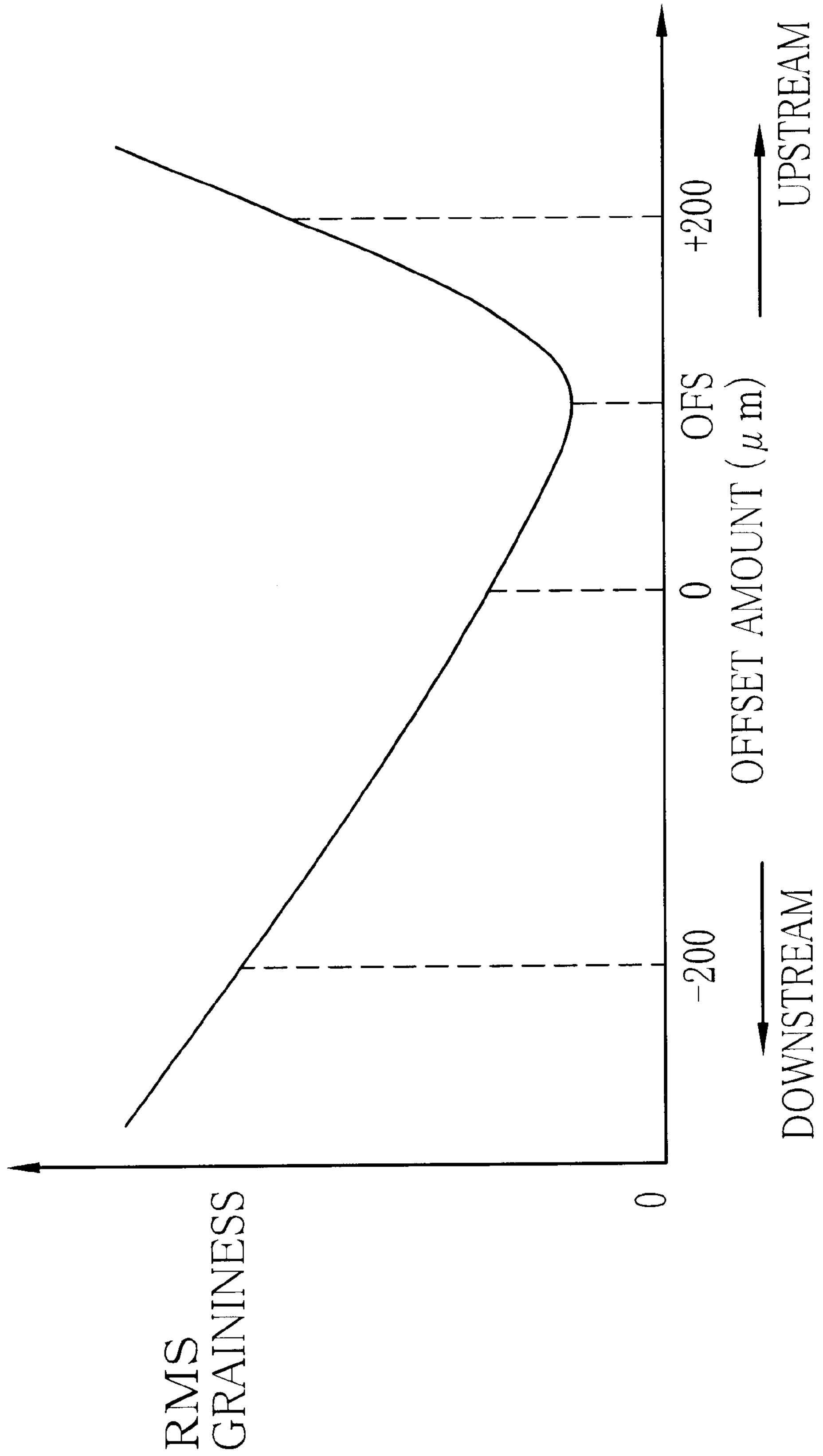
FIG. 5 is a graph showing a relationship between the offset amount and direction of the platen roller and surface graininess of the color recording material.

FIG. 5 shows a characteristic curve of graininess or granularity of the recorded image on the color recording material 2 with respect to the offset amount of the center of the platen roller 13 relative to the center CL1 of the heating element 38, wherein the graininess is expressed as the root-mean-square (RMS) value, whereas the offset amount is expressed as a positive value for the offset toward the paper supply side or as a negative value for the offset toward the paper exit side.

The lowest RMS value is the most preferable graininess. Therefore, displacing the center of the platen roller 13 in an upstream direction of the paper conveying direction by an offset amount OFS from the center CL1 of the heating element 38 is the most preferable, as shown in FIG. 5. Although the optimum offset amount OFS varies depending upon the length of the heating element 38 in the paper conveying direction and other factors, it is preferable to make the offset amount 1/10 of the length of the heating element 38 in the paper conveying direction. In other words, a position where the center of the platen roller 13 divides the heating element 38 with a ratio of 2:3. In this instance, the optimum offset amount OFS is about 100 $\mu$m.

Figure 6A:
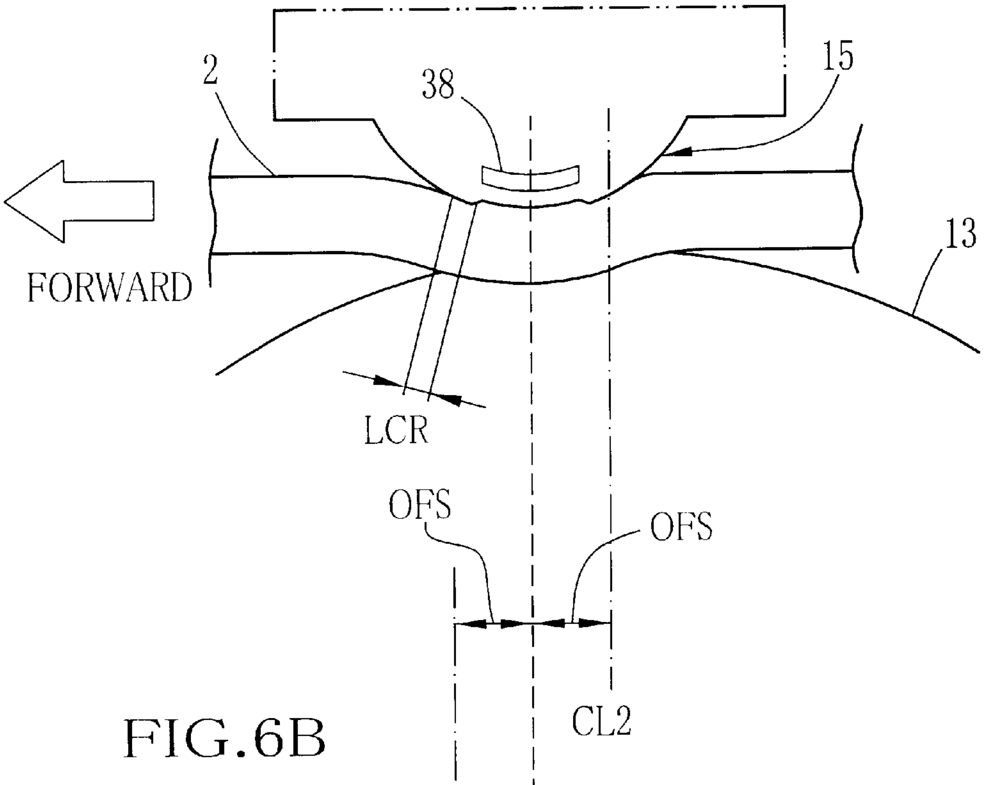
FIGS. 6A and 6B are explanatory diagrams illustrating relationships between the heating element array, the color recording material and the platen roller in a forward conveying direction as well as in a backward conveying direction of the color recording material.
Figure 6B:
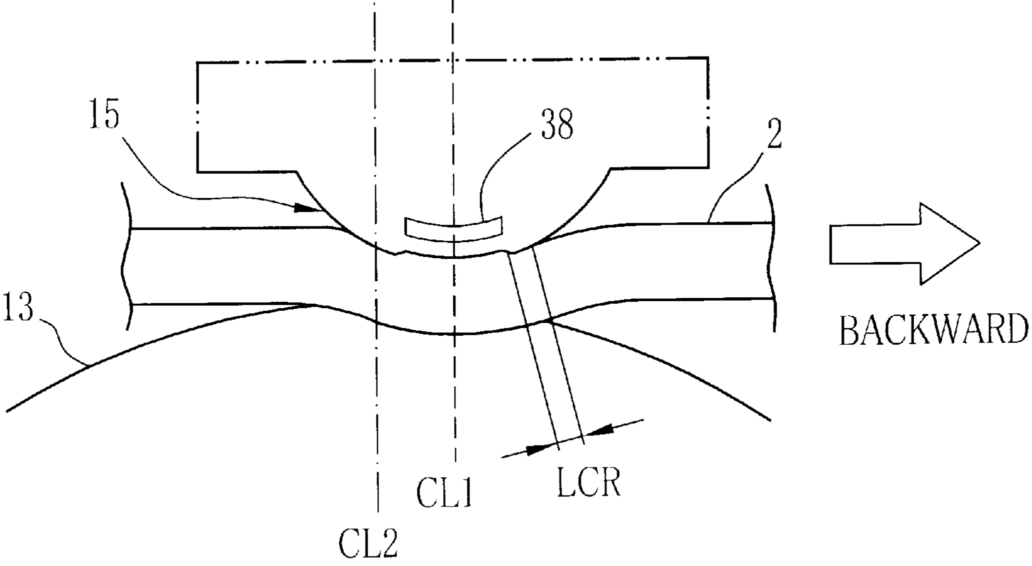

As shown in FIG. 6A, since the color recording material 2 is conveyed in the forward direction for recording the yellow frame and cyan frame and in the backward direction for recording the magenta frame, a predetermined higher voltage than the reference voltage is applied to the piezoelectric actuators 44, so that the center CL2 of the platen roller 13 is displaced by the offset amount OFS from the center CL1 of the heating element 38 toward the paper supply side during the yellow recording and the cyan recording. On the other hand, a predetermined lower voltage than the reference voltage is applied to the piezoelectric actuators 44, so that the center CL2 of the platen roller 13 is displaced by the offset amount OFS toward the paper exit side during the magenta recording, as shown in FIG. 6B.

By displacing the center CL2 of the platen roller 13 upstream from the center CL1 of the heating element 38 by the offset amount OFS in the paper conveying direction, a contact length LCR of the color recording material 2 with the downstream portion of the heating element array 15 from the heating element 38 becomes shorter than a contact length of the color recording material 2 with the upstream portion of the heating element array 15 from the heating element 38 with respect to the paper conveying direction. Therefore, the color recording material 2 removes off the heating element array 15 in a shorter time after being heated by the heating element 38. Therefore, the color recording material 2 is not so quickly cooled by the glaze layer 32, but cooled in a way suitable for providing the optimum graininess of the recorded image.

Now the operation of the thermosensitive color printer having the above configuration will be described.

First, image data for yellow, magenta and cyan of a full-color image to print is written on the image memory.

Upon a print command, the system controller 12 applies the predetermined higher drive voltage to the piezoelectric actuators 44 of the offset adjusting mechanism 25 through the driver 45, so the piezoelectric actuators 44 set the platen roller 13 to a first offset position where the center CL2 of the platen roller 13 is displaced by the offset amount OFS from the center CL1 of the heating element 38 toward the paper supply side.

Next, the system controller 12 activates a not-shown paper supply mechanism to feed out the color recording material 2 to the platen roller 13. During the paper supply movement, the thermal head 14 is set at the retracted position away from the platen roller 13. When the leading end of the color recording material 2 in the paper supply direction, i.e. the forward direction F, is detected by the edge sensor **28*b* that is disposed behind the platen roller 13 in the forward direction F, the paper supply movement stops. Thereafter, the head swing mechanism 16 sets the thermal head 14 to the pressing position, to nip the color recording material 2 between the platen roller 13 and the heating element array 15. Also the yellow fixing device 23 turns on the ultraviolet lamp 23*a***.

Then the system controller 12 drives the pulse motor 17 through the motor driver 18 to rotate forward, so the platen roller 13 is driven to rotate counterclockwise in FIG. 2, conveying the color recording material 2 in the forward direction F. While the color recording material 2 is being conveyed forward, the counter 27 starts counting the drive pulses applied to the pulse motor 17 since when the edge sensor **28*b* detects the leading edge of the color recording material 2. So the system controller 12 determines the position of the color recording material 2 on the paper transport path with reference to the count of the counter 27**.

When the system controller 12 determines that a leading end of an image recording area of the color recording material 2 comes under the heating element array 15, the system controller 12 reads out the yellow image data of a first line from the image memory 21 and sends it to the head driver 20. In accordance with the yellow image data of the first line, the head driver 20 controls conduction times of the respective heating elements 38 of the heating element array 15 such that the heating elements 38 generates variable heat energies corresponding to the yellow image data. Subsequently, the yellow coloring layer 6 develops a line of yellow dots whose densities correspond to the yellow image data of the first line.

Thereafter when the color recording material 2 is conveyed a length corresponding to one line, the yellow image data of a second line is read out from the image memory 21, so the heating elements 38 are driven for different times in accordance with the yellow image data of the second line, recording the second line of the yellow frame. In this way, the thermal head 14 records the yellow frame line by line.

Since the platen roller 13 is in the first offset position where the center CL2 of the platen roller 13 is displaced by the offset amount OFS from the center CL1 of the heating element 38 toward the paper supply side, and the color recording material 2 is conveyed in the forward direction F during the yellow recording, as shown in FIG. 6A, the downstream contact length LCR of the color recording material 2 with the heating element array 15 behind the heating element 38 in the paper conveying direction becomes so short that the color recording material 2 removes off the heating element array 15 in shorter time after being heated by the heating element 38. Therefore, the color recording material 2 is not so quickly cooled by the glaze layer 32, so the graininess of the recorded yellow frame becomes optimum.

The recorded yellow frame is optically fixed by the near-ultraviolet rays from the yellow fixing device 23. When the color recording material 2 is conveyed forward to a position where the last line of the yellow frame is recorded and fixed, the platen roller 13 stops rotating and the color recording material 2 stops.

While the platen roller 13 and the color recording material 2 stops, the system controller 12 applies the predetermined lower drive voltage to the piezoelectric actuators 44 through the driver 45, to slide the bearing members 40 in the forward direction to set the platen roller 13 to a second offset position where the center CL2 of the platen roller 13 is displaced by the offset amount OFS from the center CL1 of the heating element 38 toward the paper exit side, as shown in FIG. 6B. The thermal head 14 may stay in the pressing position or may be reset to the retracted position while the platen roller 13 is switched from the first offset position to the second offset position.

After setting the platen roller 13 to the second offset position, the system controller 12 turns the ultraviolet lamp **24*a* of the magenta fixing device 24 on, and drives the pulse motor 17 to rotate reversely, so the platen roller 13 rotates clockwise in FIG. 2 to convey the color recording material 2 in the backward direction B. When the trailing edge of the color recording material 2 in the forward direction F, i.e. the leading edge of the color recording material 2 in the backward direction B, is detected by the edge sensor 28*a* that is placed behind the platen roller 13 in the backward direction B, the system controller 12 starts counting the drive pulses applied to the pulse motor 17, and determines the conveyed position of the color recording material 2 based on the count of the counter 27**.

When the last line of the yellow frame on the color recording material 2, that is a trailing end of the image recording area in the forward direction F, comes under the heating element array 15, the system controller 12 begins to read out the magenta image data from the image memory 21 sequentially from the last line to the first line in synchronism with the conveying movement of the color recording material 2 in the backward direction B. Thus, the head driver 20 drives the heating elements 38 of the heating element array 15 to record the magenta frame on the magenta coloring layer 6 line-sequentially from the last line to the first line.

Since the platen roller 13 is in the second offset position where the center CL2 of the platen roller 13 is displaced by the offset amount OFS from the center CL1 of the heating element 38 toward the paper exit side, and the color recording material 2 is conveyed in the backward direction F during the magenta recording, as shown in FIG. 6B, the downstream contact length LCR of the color recording material 2 with the heating element array 15 behind the heating element 38 in the paper conveying direction becomes so short that the color recording material 2 removes off the heating element array 15 in a shorter time after being heated by the heating element 38. Therefore, the color recording material 2 is not so quickly cooled by the glaze layer 32, so the graininess of the recorded magenta frame becomes optimum.

The recorded magenta frame is optically fixed by the ultraviolet rays from the magenta fixing device 24. When the color recording material 2 is conveyed backward to a position where the first line of the magenta frame is recorded and fixed, the platen roller 13 stops rotating and the color recording material 2 stops.

Then, the system controller 12 applies the predetermined higher drive voltage to the piezoelectric actuators 44, so the platen roller 13 is switched again from the second offset position to the first offset position, as shown in FIG. 6A. Thereafter, the platen roller 13 is driven again to rotate clockwise in FIG. 2, conveying the color recording material 2 in the forward direction F. While the color recording material 2 is being conveyed in the forward direction F, the color recording material 20 drives the heating elements 38 in accordance with the cyan image data to record the cyan frame line-sequentially from the first line to the last line. After the full-color image is recorded in the three-color frame sequential fashion on the color recording material 2, the color recording material 2 is ejected through the paper exit 11.

Since the platen roller 13 is set to the second offset position during the cyan recording, the downstream contact length LCR of the color recording material 2 with the heating element array 15 is so short that the graininess of the recorded cyan frame becomes optimum, in the same way as for the yellow recording.

Also because the contacting condition of the heating element array 15 with the color recording material 2 is practically equivalent in either conveying direction, i.e. for the three colors, the surface roughness of the color recording material 2 after having one color recorded thereon is not different from color to color. That is, the surface roughness of those portions having yellow dots alone is substantially equal to the surface roughness of those portions having magenta dot alone. Accordingly, the surface roughness of the color recording material 2 becomes substantially uniform in the entire image recording area.

Meanwhile, since the heat energies necessary for coloring the yellow, magenta and cyan coloring layers 6, 5 and 4 are different, the temperature of the heating element array 15 changes from color to color. As a result, the protection layer 7 of the color recording material 2 is softened differently from color to color. That is, the protection layer 7 is softened more as the temperature of the heating element array 15 gets higher. With an increase in softness of the protection layer 7, the contacting length of the color recording material 2 with the heating element array 15 increases, so the contacting condition of the color recording material 2 with the heating element array 15 slightly changes from color to color even with the same offset amount.

Figure 7:
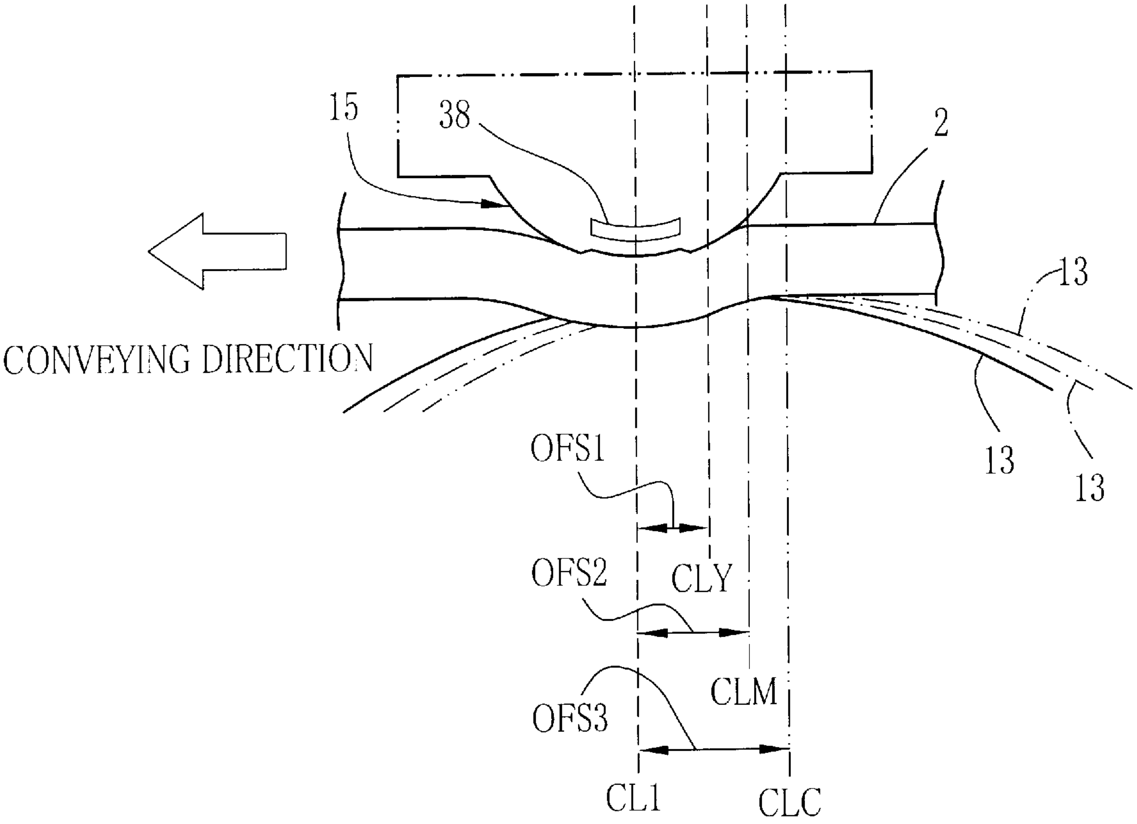
FIG. 7 is an explanatory diagram illustrating another embodiment of the present invention, wherein the offset amount of the platen roller varies depending upon the color to record.

To make the contacting condition of the color recording material 2 with the heating element array 15 uniform for either color, in spite of the difference in softness of the protection layer 7, a second embodiment of the present invention uses slightly different offset amounts for the three colors, as shown in FIG. 7. Providing that OFS1, OFS2 and OFS3 are the offset amounts for yellow, magenta and cyan respectively, these amounts satisfy the following relationship: OFS1<OFS2<OFS3.

In FIG. 7, CLY, CLM and CLC show respective center lines of the platen roller 13 in the different offset positions during the yellow recording, the magenta recording and the cyan recording, though the offset direction and the paper conveying direction for the magenta is reversed to the actual directions, for the sake of clearly showing the difference between the offset amounts CLY, CLM and CLC.

Although the present invention has been described with respect to a case where recording of the three color frames is carried out alternately in both paper conveying directions, the thermosensitive printer of the present invention is applicable to the printing method where the color frame recording is carried out only while the color recording material 2 is being conveyed in one direction. In that case, the platen roller 13 is displaced in the same offset direction for any colors It is also possible to displace the center of the heating element array from the center of the platen roller by shifting the position of the thermal head along the paper transport path.

Although the thermosensitive printer of the above embodiment is a platen-driven type where the color recording material 2 is conveyed by rotating the platen roller 13, the present invention is applicable to a capstan-driven type thermosensitive printer where the color recording material 2 is conveyed by use of pairs of conveyer rollers.

Thus, the present invention is not to be limited to the above embodiments but, on the contrary, various modification will be possible to those skilled in the art, without departing from the scope of claims appended hereto.

What is claimed is:

1. A thermosensitive printer that records an image on a thermosensitive recording material by heating the thermosensitive recording material through an array of plural heating elements of a thermal head as the thermosensitive recording material is conveyed in a conveying direction perpendicularly to the array of the heating elements, said thermosensitive printer comprising:

a platen roller placed in opposition to the array of the heating elements, for supporting the thermosensitive recording material from its back side while the heating elements are pressed onto an obverse side of the thermosensitive recording material; and an offset adjusting device for adjusting offset amount and offset direction of a rotary center of the platen roller from a center of the heating element in the conveying direction of the thermosensitive recording material.

2. A thermosensitive printer as recited in claim 1, wherein the heating elements are located along a summit of a semi-cylindrical protrusion of a glaze layer of the thermal head, said protrusion extending perpendicularly to the conveying direction of the thermosensitive recording material.

3. A thermosensitive printer as recited in claim 1, wherein said offset adjusting device displaces the center of the platen roller by a predetermined amount upstream from the center of the heating element in the conveying direction of thermosensitive recording material.

4. A thermosensitive printer as recited in claim 3, wherein said offset adjusting device displaces the platen roller along the conveying direction of the thermosensitive recording material.

5. A thermosensitive printer as recited in claim 4, wherein said offset adjusting device comprises a pair of piezoelectric actuators coupled to bearing members of a rotary shaft of the platen roller, for sliding said bearing members back or forth along the conveying direction of the thermosensitive recording material in an amount and a direction which are determined by a voltage applied to said piezoelectric actuators.

6. A thermosensitive color printer that records a full-color image on a thermosensitive color recording material having thermosensitive coloring layers for yellow, magenta and cyan, by heating the thermosensitive color recording material through an array of plural heating elements of a thermal head, wherein the thermosensitive color recording material is conveyed alternately in opposite conveying directions perpendicular to the array of the heating elements, to record the full-color image in a three-color frame sequential fashion, said thermosensitive printer comprising:

a platen roller placed in opposition to the array of the heating elements, for supporting the thermosensitive color recording material from its back side while the heating elements are pressed onto an obverse side of the thermosensitive color recording material; and an offset adjusting device for adjusting offset amount and offset direction of a rotary center of the platen roller from a center of the heating element along the conveying directions of the thermosensitive color recording material.

7. A thermosensitive color printer as recited in claim 6, wherein the heating elements are located along a summit of a semi-cylindrical protrusion of a glaze layer of the thermal head, said protrusion extending perpendicularly to the conveying directions of the thermosensitive color recording material.

8. A thermosensitive color printer as recited in claim 6, wherein said offset adjusting device displaces the center of the platen roller upstream from the center of the heating element in the conveying direction for each color of the thermosensitive recording material.

9. A thermosensitive color printer as recited in claim 8, wherein the offset amount of the center of the platen roller from the center of the heating element is predetermined for each color.

10. A thermosensitive color printer as recited in claim 8, wherein said offset adjusting device displaces the platen roller along the conveying directions of the thermosensitive color recording material.

11. A thermosensitive color printer as recited in claim 10, wherein said offset adjusting device comprises a pair of piezoelectric actuators coupled to bearing members of a rotary shaft of the platen roller, said piezoelectric actuators sliding said bearing members back or forth along the conveying directions of the thermosensitive color recording material in an amount and a direction which are determined by a voltage applied to said piezoelectric actuators.

* * * * *